No. 877,717. PATENTED JAN. 28, 1908.
J. JONES.
ANIMAL SHACKLE.
APPLICATION FILED APR. 8, 1907.
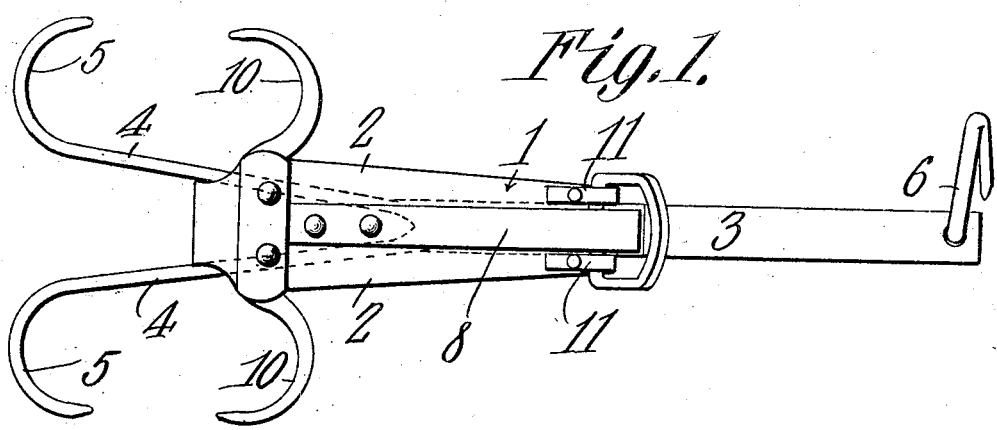
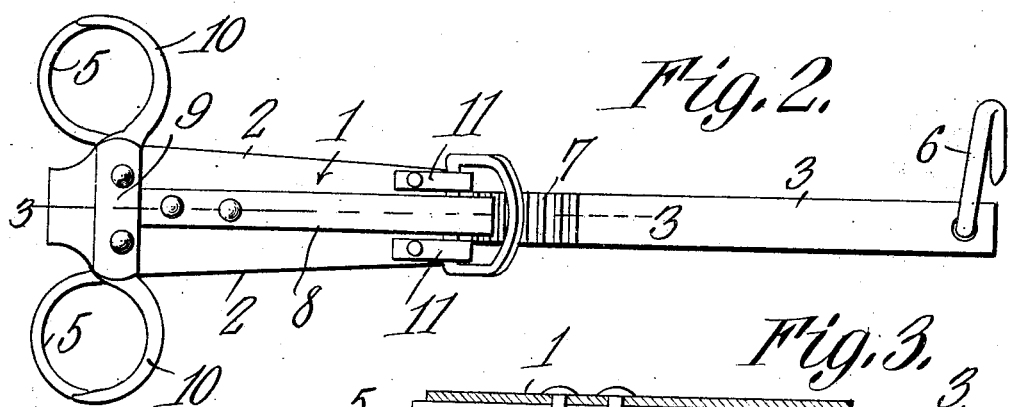
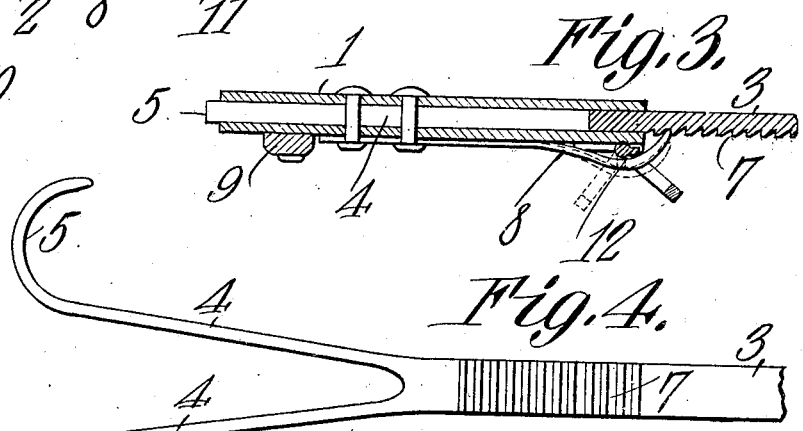
Jesse Jones,
INVENTOR.
WITNESSES:
By ATTORNEYS

UNITED STATES PATENT OFFICE.

JESSE JONES, OF OTTUMWA, IOWA.

ANIMAL-SHACKLE.

No. 877,717.

Specification of Letters Patent.

Patented Jan. 28, 1908.

Application filed April 8, 1907. Serial No. 367,100.

*To all whom it may concern:*

Be it known that I, JESSE JONES, a citizen of the United States, residing at Ottumwa, in the county of Wapello and State of Iowa, have invented a new and useful Animal-Shackle, of which the following is a specification.

This invention relates to animal shackles used in slaughtering and packing houses for suspending by both hind legs animals to be slaughtered.

The object of the invention is to provide a strong, simple and effective device for the purpose described, by means of which more animals can be caught and handled than with the ordinary shackle and with less labor. The shackle of the present invention will not break the legs nor twist them out of joint by the exertion of the animal to free itself, a common occurrence where a single leg shackle is used, which accidents cause the clotting of blood around the injured part and subjects the meat of such injured animals to condemnation.

With this and other objects in view, the invention consists of the novel construction, combination and arrangement of parts hereinafter described and claimed.

In the accompanying drawings: Figure 1 is a face view of the shackle in open position. Fig. 2 is a similar view of the device closed. Fig. 3 is a longitudinal sectional view on the line 3—3 of Fig. 2. Fig. 4 is a detached view of a part of the invention.

Similar numerals of reference indicate the same parts on all the figures.

The numeral 1 indicates a casing of such size and shape as best suits the purpose, but here shown as a flat, box-like structure of metal with sides 2 tapering slightly toward one end, within which is arranged to slide in a longitudinal direction a bar 3 provided at one end with twin arms 4 diverging slightly from each other and terminating each in a hook 5. At the opposite end of the bar 3 is a ring 6 by which the shackle is suspended. On one face of the sliding bar 3, near where the twin arms 4 branch, are a number of ratchet teeth 7 with which a spring pawl 8, riveted to the casing 1, engages.

Riveted to the widest part of the casing 1 and near the end where the twin arms emerge is a plate 9, extending across said casing, on each end of which plate is a curved hook 10 adapted to engage at times with the hook 5. The spring pawl 8 projects beyond the narrow end of the casing and curves downwardly to engage the ratchet teeth on the sliding bar 3. Journaled in bearing blocks 11 at the narrow end of the casing is a cam 12, extending crosswise of the casing under the spring 8. A curved, ring-like handle is attached to the journals of the cam 12 which, when moved in one direction raises the spring pawl 8 out of engagement with the ratchet teeth, and when moved in the opposite direction releases the pawl which springs into engagement with said teeth.

On referring to Figs. 1 and 2 of the drawing, it will be noted that the hooks 5 on the twin arms 4 are in line with the hooks 10 on the casing; therefore, if the sliding bar 3 is drawn to the right or the casing moved to the left, the hooks 5 and 10 will come together and form a ring, as in Fig. 2, the points of the hooks overlapping. The ratchet teeth are sloped in such direction that the pawl 8 slips over them when the parts move to close the hooks, but locks the sliding bar against reverse movement unless raised therefrom by the cam.

In operation the hooks are normally separated as in Fig. 1, but as soon as the legs of an animal are caught by the hooks 5, the casing is immediately pushed down on the sliding bar 3 and the hooks 10, closing on the hooks 5, the animal is secured against escape. The shackle is removed from the carcass after the animal is killed and dressed by turning the cam 12 to raise the spring pawl 8 and if the ring-like handle is turned back far enough to rest on the casing, the pawl will be held out of contact with the ratchet teeth because the operating end of the cam will be carried across its axis of rotation and the pressure of the spring pawl will tend to hold the handle against the casing. The casing 1 and sliding bar 3 are then moved relatively to each other and the hooks 5 and 10 separated.

Having thus described the invention, what is claimed is:

1. A shackle comprising a hollow casing having a forwardly curved hook on each side near one end, a bar having teeth on one side and a V-shaped forked end slidably mounted in said casing, the forked ends of said bar terminating in rearwardly curved hooks, said bar and hooks being integral, and a latch for engaging said teeth.

2. A shackle comprising a hollow casing, a plate secured to one face of the casing near one end having forwardly projecting hooks extending beyond the sides of the casing, a bar having teeth on one side and a spreading forked end terminating in rearwardly curved hooks slidably mounted in said casing, said hooks being in line with the hooks on the casing and adapted to form with them two closed rings when drawn toward each other by the relative movement of the parts carrying them, suspending means on the other end of said bar, a spring latch fastened to the casing and engaging said teeth, and a cam on said casing for lifting said latch when turned to disconnect the latch from the teeth and hold it out of engagement therewith.

In testimony that I claim the foregoing as my own, I have hereto affixed my signature in the presence of two witnesses.

JESSE JONES.

Witnesses:
 JOHN F. PECK,
 M. L. TOLAND.